(12) United States Patent
Meyer

(10) Patent No.: US 9,914,494 B1
(45) Date of Patent: Mar. 13, 2018

(54) SPORTING EVENT HOSPITALITY SYSTEM

(71) Applicant: Roger Meyer, Arlington, TX (US)

(72) Inventor: Roger Meyer, Arlington, TX (US)

(*) Notice: Subject to any disclaimer, the term of this patent is extended or adjusted under 35 U.S.C. 154(b) by 0 days.

(21) Appl. No.: 15/365,574

(22) Filed: Nov. 30, 2016

Related U.S. Application Data

(60) Provisional application No. 62/260,823, filed on Nov. 30, 2015.

(51) Int. Cl.
| | |
|---|---|
| *B62D 25/00* | (2006.01) |
| *B62D 47/02* | (2006.01) |
| *B60R 11/02* | (2006.01) |
| *B60H 1/22* | (2006.01) |

(52) U.S. Cl.
CPC ........... *B62D 47/02* (2013.01); *B60H 1/2225* (2013.01); *B60R 11/0229* (2013.01)

(58) Field of Classification Search
CPC ...... B62D 47/02; B60H 1/225; B60R 11/0229
See application file for complete search history.

(56) References Cited

U.S. PATENT DOCUMENTS

| | | | | |
|---|---|---|---|---|
| 5,862,827 A * | 1/1999 | Howze | ................ | A01M 31/025 135/140 |
| 6,425,625 B1 * | 7/2002 | Messano | .................. | B60P 3/34 296/156 |
| 7,014,238 B2 * | 3/2006 | Gonzalez | ................. | B60P 1/02 135/88.01 |
| 7,815,015 B2 * | 10/2010 | Kerns | ................. | A01M 31/025 182/127 |
| 8,484,908 B2 * | 7/2013 | Hache | ....................... | B60P 3/14 137/234.6 |
| 8,777,254 B1 * | 7/2014 | Fowler | ................ | A01M 31/025 280/656 |
| 2009/0205880 A1 * | 8/2009 | Hammonds | .......... | B62D 33/063 180/6.48 |
| 2009/0224570 A1 * | 9/2009 | Haswell | ................ | B62D 47/02 296/178 |
| 2011/0101719 A1 * | 5/2011 | James | ...................... | B60J 7/165 296/26.04 |
| 2013/0062900 A1 * | 3/2013 | Bullard | .................... | B60P 3/34 296/26.04 |

* cited by examiner

*Primary Examiner* — Lori L Lyjak
(74) *Attorney, Agent, or Firm* — Law Office of Jeff Williams; J. Oliver Williams

(57) ABSTRACT

A system includes a mobile vehicle having a roof with a top surface; a plurality of lounge chairs secured to the top surface; a heater telescopically engaged to the top surface and positioned above the plurality of lounge chairs; a television pivotally secured to the heater; and an observation platform telescopically engaged with the top surface and configured to support at least one lounge chair of the plurality of lounge chairs.

1 Claim, 4 Drawing Sheets

SPORTING EVENT HOSPITALITY SYSTEM

BACKGROUND

1. Field of the Invention

The present invention relates generally to recreational systems, and more specifically, to sporting event hospitality systems.

2. Description of Related Art

Sporting event hospitality systems are well known in the art and are effective means to provide an elevated location from which to view an event. For example, FIG. 1 depicts a conventional roof top observation system 101 having a recreational vehicle 103, an elevated observation area 105, and seating 107, 108. During use, spectators (not shown) sit on the roof top observation system 101 in order to watch an event 111.

One of the problems commonly associated with system 101 is its limited use. For example, because system 101 repurposes a recreational vehicle for spectating events, space is used inefficiently and many entertainment features are necessarily neglected.

Accordingly, although great strides have been made in the area of sporting event recreation systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
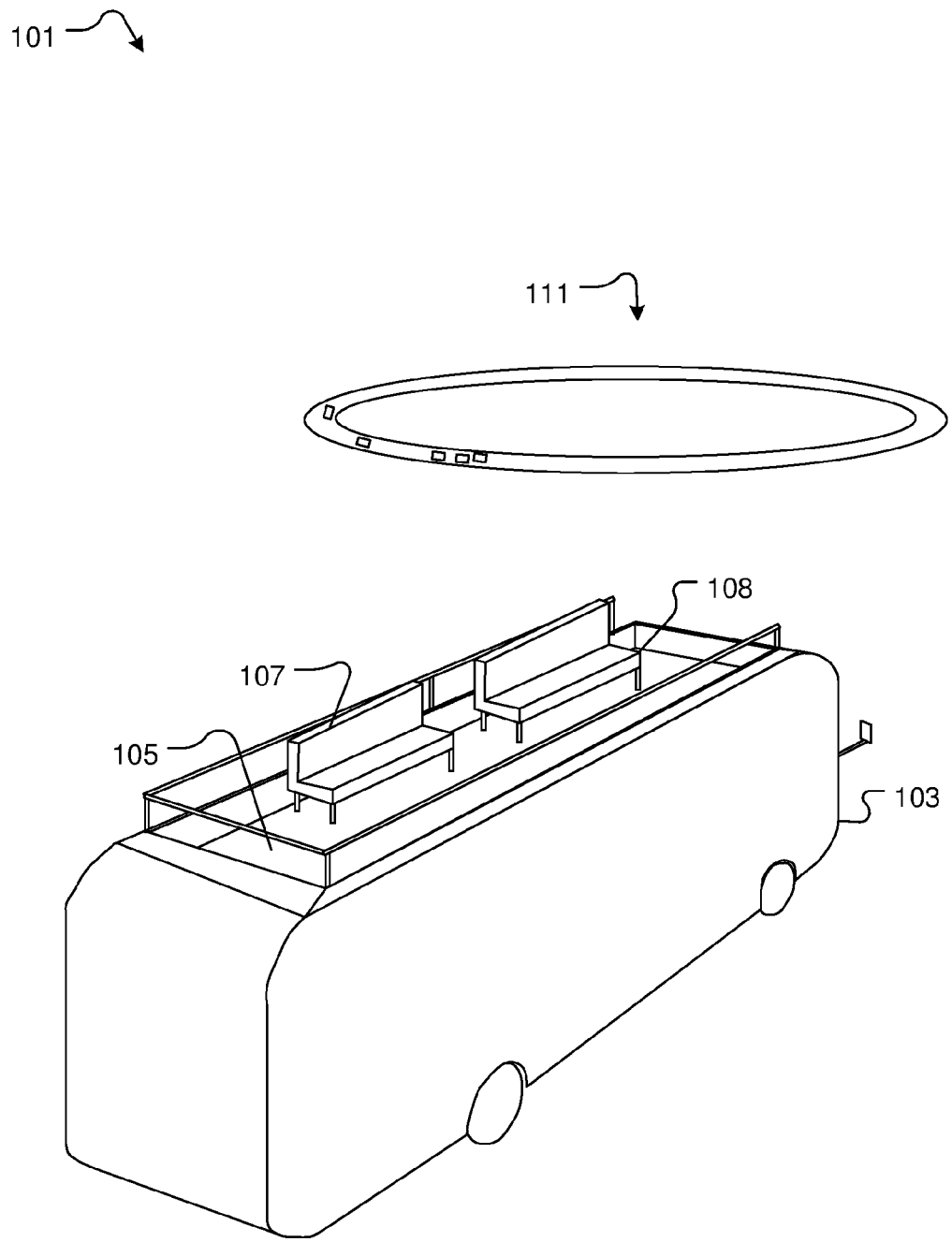
FIG. 1 is a simplified, perspective view of a common sporting event hospitality system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with roof top observation systems. Specifically, the present application contemplates a dedicated unit specialized for spectating sporting events and comprising multiple entertainment features. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
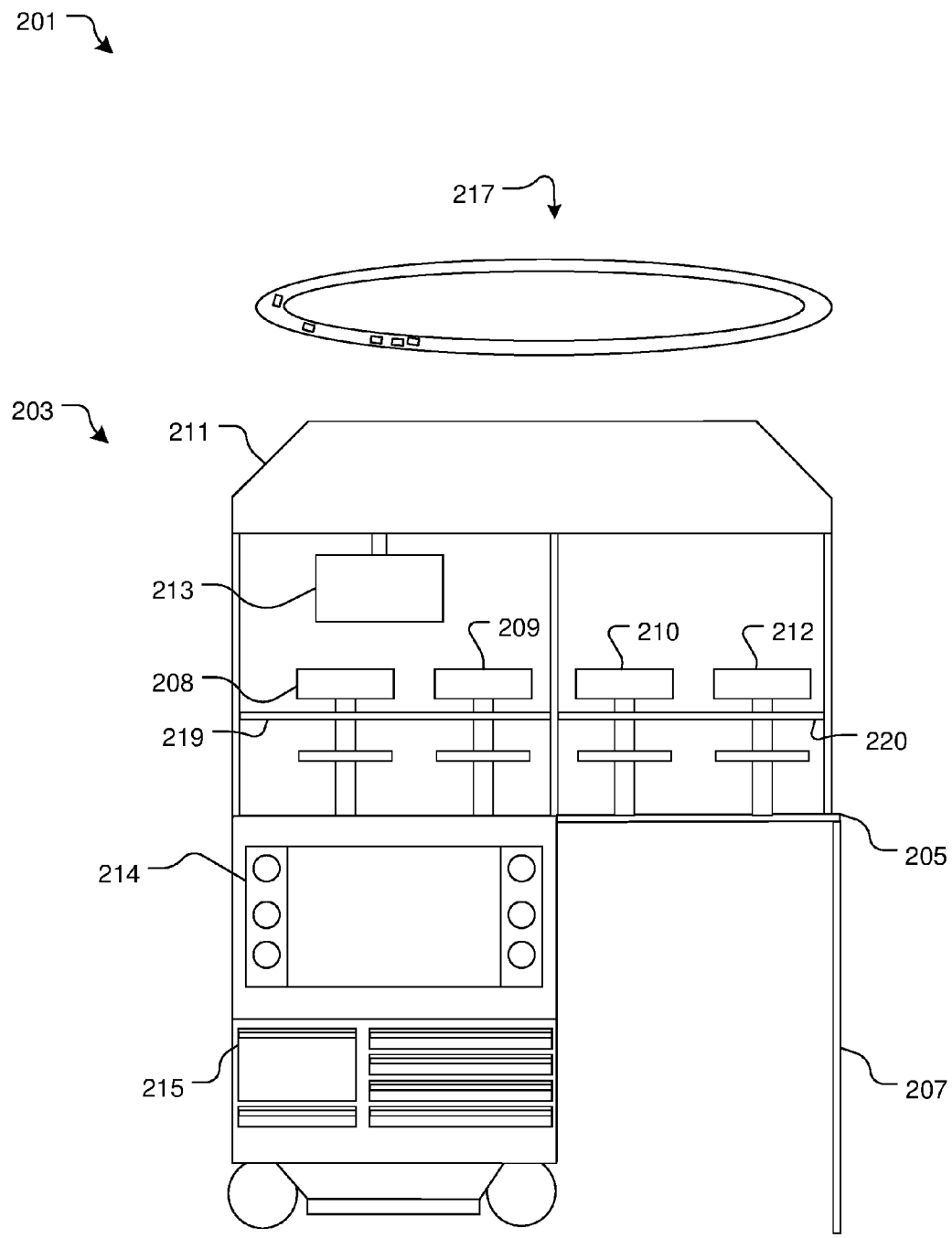
FIG. 2 is a front view of a sporting event hospitality system in accordance with a preferred embodiment of the present application.

Referring now to the drawings wherein like reference characters identify corresponding or similar elements throughout the several views, FIG. 2 depicts a front view of a sporting event hospitality system in accordance with a preferred embodiment of the present application. It will be appreciated that system 201 overcomes one or more of the above-listed problems commonly associated with conventional roof top observation systems.

In the contemplated embodiment, system 201 includes one or more self-contained entertainment vehicles 203 comprising one or more observation platforms 205, an accessing means 207 for reaching the observation platform 205, a means for lounging or sitting 208, 209, 210, 212, one or more heater 211 for regulating temperature about the seating area, one or more means televisions 213, 214 secured to the roof of the heater, one or more means for food or refreshments 215, and one or more means of safety 219, 220.

During use, the self-contained vehicle 203 is stationed at a sporting event 217 such that one or more individuals can observe the sporting event 217 from the observation platform 205 while enjoying the regulated temperature 211 and means for lounging 208, 209, 210, 212, entertainment 213, food and refreshments 215. The means of safety 219, 220 are used to prevent harm or injury while the system is in use. It is contemplated and will be appreciated that vehicle 203 and its various components can be configured to mimic an atmosphere conducive to enjoying sporting events, such as a sports bar or a living room.

One of the unique features believed characteristic of the present application is that vehicle 203 is a self-contained unit that facilitates the installation, storage, and transport, of its various components.

Figure 3:
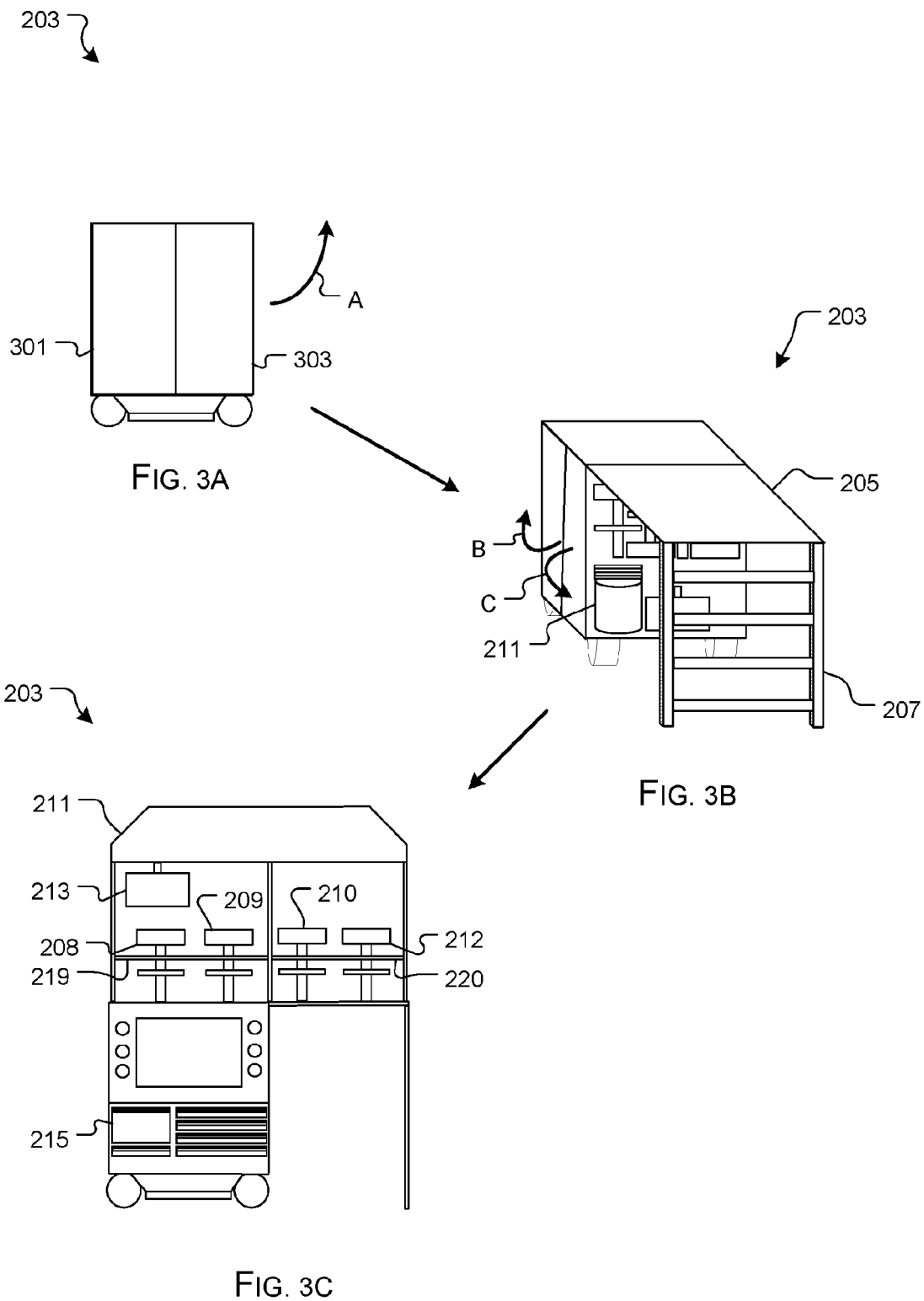
FIGS. 3A, 3B and 3C are a front view, a perspective view and a front view, respectively, depicting the sporting event hospitality system of FIG. 2 at various stages of deployment.

Referring now to FIGS. 3A, 3B, and 3C system 201 is shown at various stages of assembly after vehicle 203 is stationed at or near a sporting event 217. The side wall is unfolded as depicted by motion A, to create platform 205 and reveal components 207, 208, 209, 210, 212, 211, 213, 215, 219, and 220 stored within the body of the vehicle 203. The front doors 301 and 303 are opened by motions B and C respectively, revealing means for entertainment 214 and refreshment 215. The means for lounging 208, 209, 210, 212, entertainment device 213, means of temperature control 211, and means of safety 219, 220 are removed from the car 203 and placed on top of the observation platform 205 completing the setup.

Figure 4:
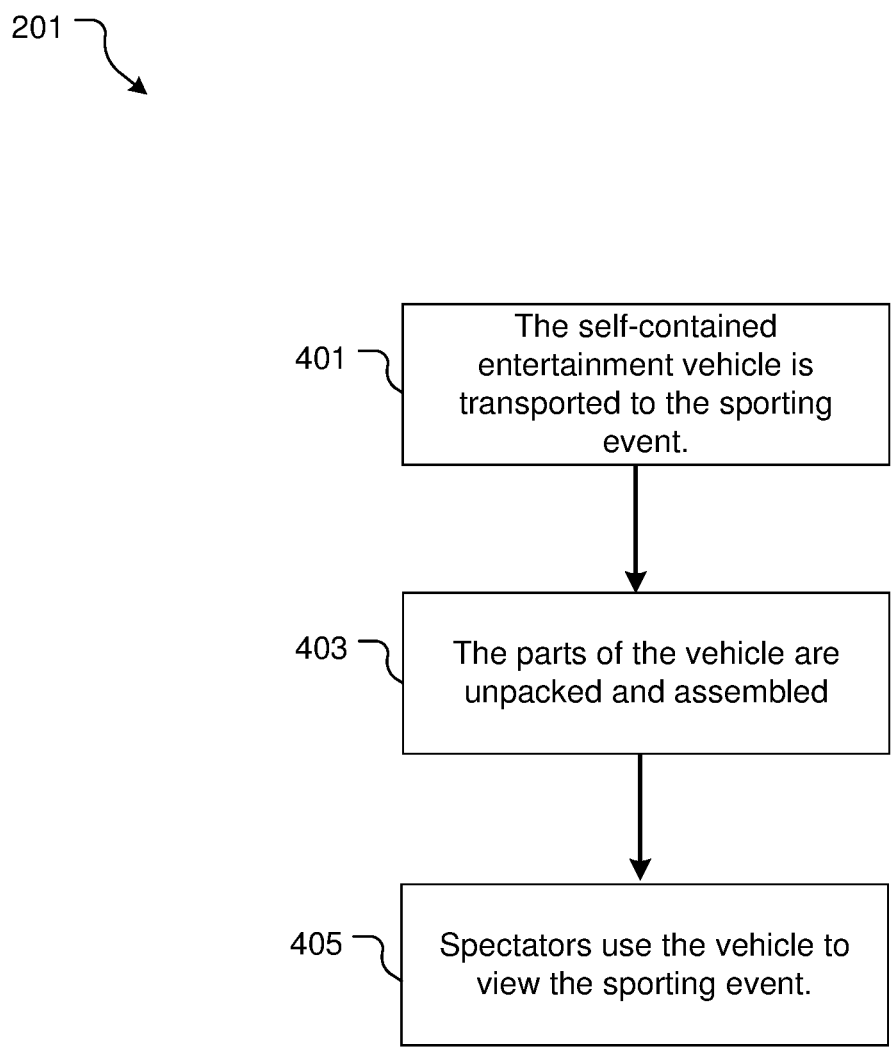
FIG. 4 is a flowchart depicting the process of FIG. 2.

Referring now to FIG. 4, a flowchart defining the process of system 201 is shown, wherein the self-contained entertainment vehicle is transported to the sporting event 401, the parts of the vehicle are unpacked and assembled 403, and the spectators use the vehicle to enjoy the sporting event 405 and the additional recreational features. The preferred embodiment includes a system having a mobile vehicle having a roof with a top surface; a plurality of lounge chairs secured to the top surface; a heater telescopically engaged to the top surface and positioned above the plurality of lounge chairs; a television pivotally secured to the heater; and an observation platform telescopically engaged with the top surface and configured to support at least one lounge chair of the plurality of lounge chairs.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A system, comprising:
    a mobile vehicle having a roof with a top surface;
    a plurality of lounge chairs secured to the top surface;
    a heater telescopically engaged to the top surface and positioned above the plurality of lounge chairs;
    a television pivotally secured to the heater; and
    an observation platform telescopically engaged with the top surface and configured to support at least one lounge chair of the plurality of lounge chairs.

* * * * *